United States Patent [19]
Eichbaum

[11] 3,741,180
[45] June 26, 1973

[54] APPARATUS FOR VAPORIZING A FUEL-AIR MIXTURE IN THE INDUCTION SYSTEM OF AN COMBUSTION ENGINE

[76] Inventor: Barlane R. Eichbaum, 12065 Stoney Brook Drive, Reno, Nev. 89502

[22] Filed: Apr. 9, 1971

[21] Appl. No.: 132,706

[52] U.S. Cl............ 123/122 A, 123/35, 123/122 H, 123/133
[51] Int. Cl...................... F02m 29/04, F02m 21/06
[58] Field of Search................. 123/122 A, 122 AC, 123/141, 122 AA, 122 AB, 122 H, 133, 34, 35

[56] References Cited
UNITED STATES PATENTS

| | | | |
|---|---|---|---|
| 1,889,270 | 11/1932 | Thomas et al. | 123/122 H |
| 1,541,431 | 6/1925 | Mason | 123/122 A |
| 1,575,333 | 3/1926 | Hamilton-Grapes | 123/122 AC |
| 1,723,954 | 8/1929 | Selfridge | 123/122 AC |
| 1,931,729 | 10/1933 | Kitchen | 123/122 AC |
| 2,001,669 | 5/1935 | Smith | 123/122 A |
| 2,001,670 | 5/1935 | Smith | 123/122 A |
| 2,232,413 | 2/1941 | Steskal | 123/122 A |
| 2,353,787 | 7/1944 | Rostoker et al. | 123/122 A |
| 2,560,220 | 7/1951 | Graziano | 123/122 A |
| 3,449,098 | 6/1969 | Larson, Sr. | 123/141 |
| 3,509,860 | 5/1970 | Ferriday | 123/141 |

Primary Examiner—Wendell E. Burns
Attorney—Jackson & Jones

[57] ABSTRACT

A combustion engine is disclosed in which the entire fuel-air mixture is vaporized within the intake manifold to combust more efficiently and completely in the combustion chamber, thereby significantly reducing exhaust emissions. The vaporization of the entire fuel-air mixture is effected by utilizing a portion or all of the available heat energy passing through the exhaust manifold in order to heat the intake manifold. In the various embodiments disclosed, the exhaust manifold either extends through, completely envelops, or is positioned adjacent the intake manifold for heat transfer purposes. In all cases, suitable bypass conduits and valve means are provided to relieve a portion or all of the heat energy from heating the intake manifold. A screen is also provided in the intake conduit between the carburetor and the intake manifold to disperse the fuel-air mixture and prevent any droplets formed in the carburetor from passing therethrough.

4 Claims, 5 Drawing Figures

APPARATUS FOR VAPORIZING A FUEL-AIR MIXTURE IN THE INDUCTION SYSTEM OF AN COMBUSTION ENGINE

BACKGROUND OF THE INVENTION

1. Field of the Invention

The present invention relates to combustion engines and more particularly to systems for preheating and vaporizing the fuel in the engines' induction system prior to combustion.

2. Description of the Prior Art

As is well known, there are three air polluting ingredients emitted into the atmosphere from the exhausts of combustion engines. These three ingredients are carbon monoxide, nitrogen oxides and unburned hydrocarbons.

Heretofore, various systems and methods have been proposed for improving combustion engine efficiency in order to reduce these exhaust pollutants.

One method has been to preheat the fuel-air mixture in the engine induction system prior to entry into the combustion chamber. This has been done in various ways, but they all suffer from various shortcomings which severely handicap their utilization and prevent their widespread acceptance.

One type of preheating system utilizes simple heating attachments positioned in the intake conduit directly below the carburetor. Such a system is illustrated in U.S. Pat. No. 3,492,457. Here the heating element comprises a quantity of electric heating coils positioned across the intake conduit. Similar heating coils functioning in the same manner are also disclosed in U.S. Pat. Nos. 2,719,520 and 2,314,140.

A heating attachment is also shown in U.S. Pat. No. 3,042,016 which utilizes a heat exchange tube extending through the intake conduit with the heat exchange tube being connected to the exhaust for receiving a small portion of the exhaust bled off to heat the tube.

A major shortcoming with these devices is that these heating elements are not large enough to intercept a sufficiently large amount of fuel-air mixture to vaporize it to a degree necessary to increase the combustion efficiency. In practice, these attachments preheat only a small portion of the fuel admitted into the intake manifold and cannot raise the temperature of the entire fuel-air mixture sufficiently to ensure complete combustion.

Other systems have been proposed which utilize screens positioned below the carburetor which attempt to intercept a portion of the fuel-air mixture traversing therethrough. These screens are somewhat successful in dispersing the mixture and some of the screens are heated to enhance the vaporization process. Such a system is shown in U.S. Pat. No. 3,482,556 which utilizes a screen which is heated by a bleed pipe being connected to the engine exhaust. A similar screen is shown in U.S. Pat. No. 3,373,726.

The problem with such screens is that they are not capable of raising the temperature of the fuel-air mixture to a degree necessary to ensure complete combustion within the combustion chamber.

Other types of fuel preheaters are disclosed in U.S. Pat. Nos. 1,465,785, and 2,179,235, and 3,338,568.

In U.S. Pat. No. 1,465,785, the fuel is passed through a radiator prior to entering the carburetor. In U.S. Pat. No. 2,179,235, the fuel is pumped through a line into a heat exchanger prior to entry into the carburetor. The heat exchanger is positioned on an exhaust conduit with the generated heat created by the exhaust passing therethrough. A shortcoming with these two systems is that the fuel is preheated prior to entering the carburetor. This is undesirable since the fuel heats the carburetor and deleteriously effects its operation. Moreover, the carburetor functions to cool off the fuel before it can become vaporized.

U.S. Pat. No. 3,338,568 shows a fuel-air mixture passing from the carburetor through a bypass conduit into a heat exchanger, which is heated by the exhaust gases from the exhaust manifold. As with the other systems, such a system cannot heat the fuel-air mixture to a degree necessary to ensure complete combustion.

SUMMARY OF THE INVENTION

The present invention obviates the above mentioned shortcomings by providing a combustion engine in which the entire intake manifold is heated by the heat energy passing through the exhaust manifold in order to raise the temperature of the entire fuel-air mixture to a degree sufficient to vaporize the mixture and maintain it in such a state to ensure complete combustion in the combustion chamber.

In the first embodiment of the present invention, the combustion engine is provided with an exhaust manifold in which an exhaust pipe extends directly through the intake manifold for heat transfer purposes. In the second embodiment, the exhaust manifold completely envelops the intake manifold while in the third embodiment, the exhaust manifold includes an exhaust pipe positioned adjacent the intake manifold in a side-by-side relationship. In these embodiments, the entire heat energy passing through the exhaust manifold is available to heat the intake manifold.

In accordance with the present invention, suitable bypass conduits are provided to bypass a portion or all of the engine exhaust from the portion of exhaust manifold contacting the intake manifold. Thermostatically controlled heat riser and valve assemblies are provided on these conduits for controlling the flow of exhaust therethrough. A screen is provided across the intake conduit between the carburetor and the intake manifold to disperse the fuel-air mixture and prevent the formation of any droplets passing therethrough.

Other cooling means such as cooling fins and water jackets may be provided to control the temperature of the exhaust manifold to prevent it from heating the intake manifold above a maximum temperature.

An important advantage of the present invention is that by utilizing the entire available heat energy passing through the exhaust manifold and by heating the entire intake manifold, the temperature of the fuel-air mixture can be maintained at a level not heretofore possible.

Another important advantage of the present invention is that the entire fuel-air mixture passing through the intake manifold is preheated, vaporized, and maintained in that condition prior to combustion in the combustion chamber. This condition ensures a more efficient and complete combustion and significantly reduces exhaust emissions.

Still another important advantage of the present invention is that the system of the present invention permits the use of leaded gasoline or even lower grades of fuel without the fear of polluting the atmosphere.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
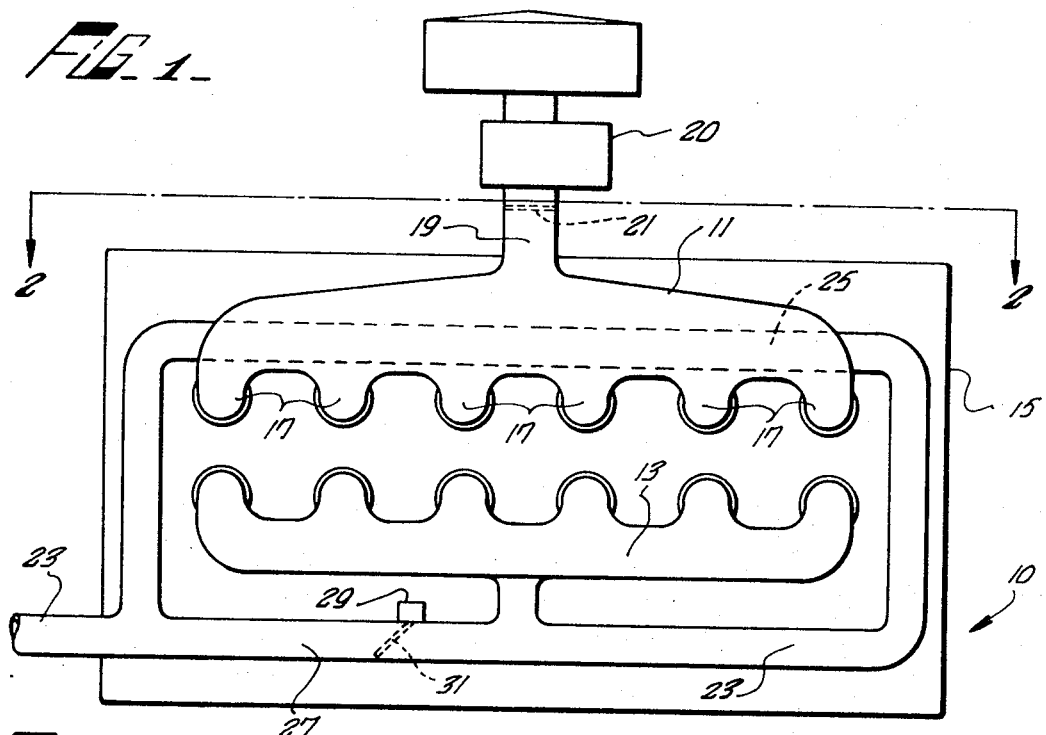
FIG. 1 is an elevational view of a combustion engine of the present invention.
Figure 2:
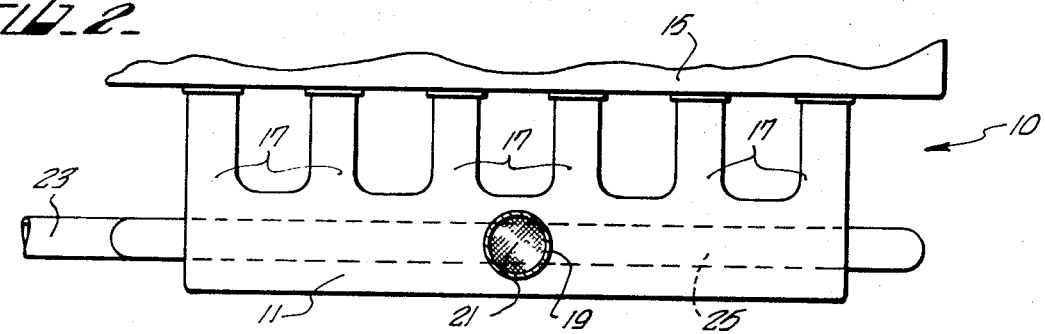
FIG. 2 is a plan view of the combustion engine taken along lines 2—2 of FIG. 1.

Referring now to the drawings, FIGS. 1 and 2 illustrate a combustion engine, generally indicated by arrow 10, having an intake manifold 11 and an exhaust manifold 13 extending out of the engine block 15. The intake manifold 11 comprises a plurality of branches 17 leading to the inlet ports of the engine cylinders (not shown) and an intake conduit 19 connected to a carburetor.

A screen 21 is mounted across the intake conduit 19 directly beneath the carburetor 20 to intercept the fuel-air mixture traversing therethrough.

The exhaust manifold 13 is connected at one end to an exhaust pipe 23, a portion 25 of which extends directly through the intake manifold 11. A bypass conduit 27 is provided to bypass the intake manifold 11 and connected with the exhaust pipe 23 on the other side thereof. A thermostatically controlled heat riser 29 is mounted on the bypass conduit 27 and includes a butterfly valve 31 extending across the conduit 27 adjacent the opening into the exhaust pipe 23.

In operation, as the fuel-air mixture is fed from the carburetor 20, the screen 21 functions to break up the fuel particles in the fuel-air mixture to create a more homogeneous and dispersed mixture as it enters the intake manifold 11. This is accomplished because the fuel droplets from the carburetor 20 cling to the screen 21 momentarily until the air rushing by breaks it up or evaporates it rather than letting it pass through in relatively large droplets.

During engine start-up, the bypass valve 31 is in the closed position, and all of the engine exhaust is passed through the portion 25 extending through the intake manifold 11 in order to heat the intake manifold 11 to a temperature above 350° F. This heating of the intake manifold 11 functions to vaporize the higher boiling ingredients of the fuel mixture and prevent any condensation from occurring prior to combustion in the engine combustion chamber. By keeping the fuel-air mixture vaporized, more efficient and complete combustion takes place in the combustion chamber. As a result, less exhaust emissions are emitted into the atmosphere.

The amount of heat required to vaporize the fuel-air mixture and maintain it in such a state depends on three factors: the ambient temperature of the outside air entering the carburetor; the volume of fuel-air mixture passing through the intake; and the temperature of the engine and manifold.

Although the maximum temperature maintained can vary, a temperature of 900° F is considered to be the maximum. Therefore, in order to relieve the excess heat passing through the intake manifold 11, the bypass valve 31 is actuated by the thermostatically controlled heat riser 29 to permit a portion or all of the exhaust to pass through the bypass conduit 27.

Figure 4:
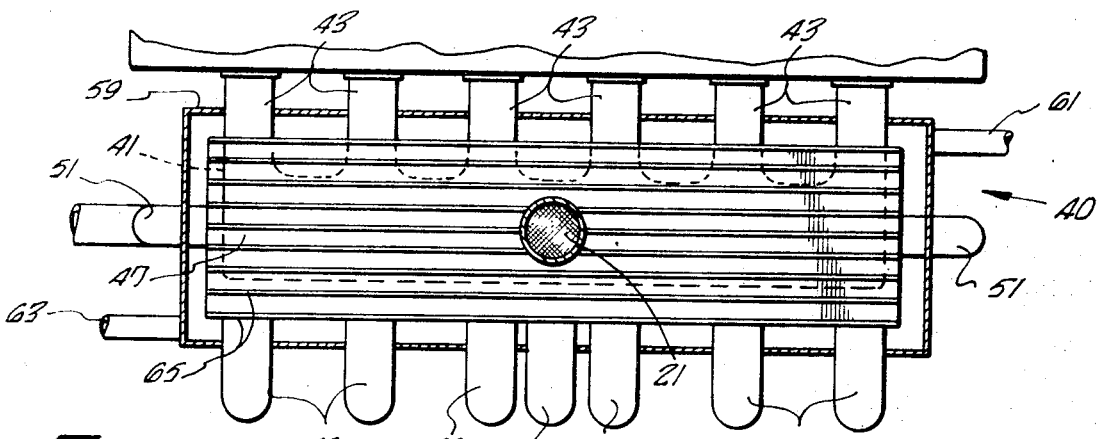
FIG. 4 is a plan view of the second embodiment taken along lines 4—4 of FIG. 3.
Figure 3:
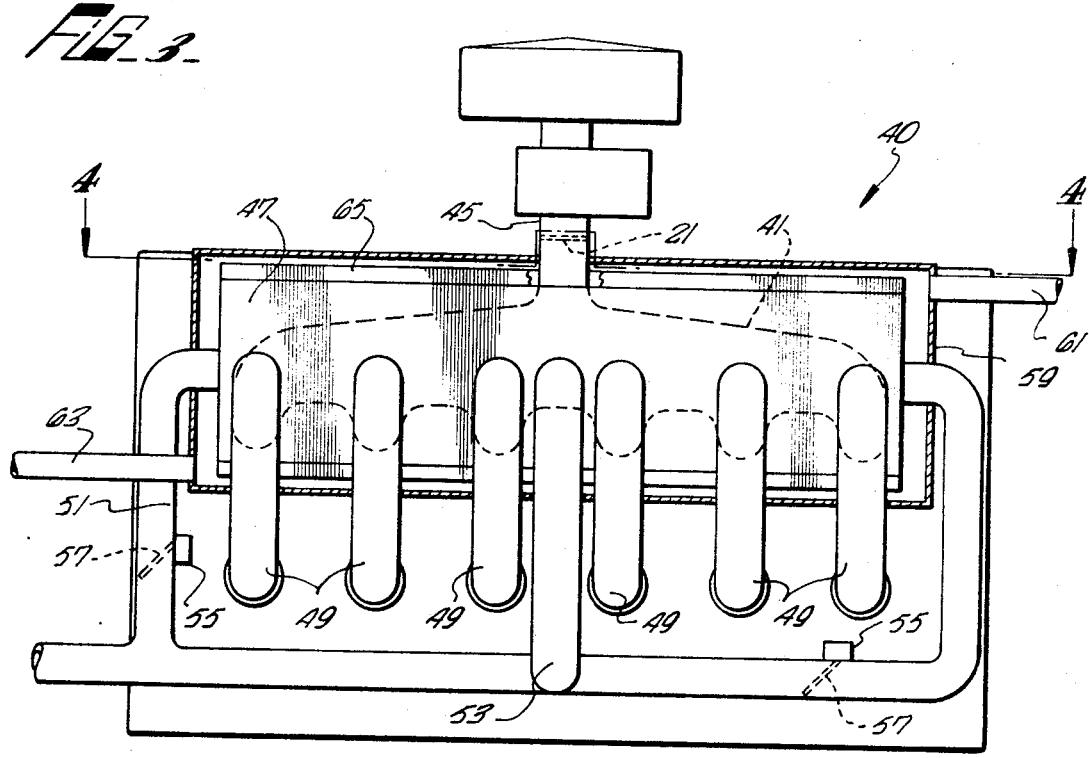
FIG. 3 is an elevational view of a second embodiment of the present invention.

FIGS. 3 and 4 illustrate a second embodiment of the present invention. In this embodiment, the engine 40 is provided with an intake manifold 41 having a plurality of branches 43, an intake conduit 45 and a screen 46, all of which function in a similar manner to the intake components of the first embodiment. In the second embodiment, an exhaust manifold 47 is provided which completely envelops the intake manifold 41. The exhaust manifold 47 further comprises a plurality of branches 49 leading from the engine 40 and a pair of exhaust pipes 51 connected at both ends thereof. A third exhaust pipe 53 is positioned at the control portion of the exhaust manifold 47.

A pair of thermostatically controlled heat risers 55 are positioned on the exhaust pipes 51. As with the previous embodiment, each heat riser 55 is connected to a butterfly valve 57 which is mounted across each of the pipes 51.

The exhaust manifold 47, in turn, is encased within a water cooling jacket 59 having an inlet 61 and an outlet 63 for permitting the ingress and egress of coolant.

For more efficient heat transfer, a plurality of cooling fins 65 are preferably mounted on the exhaust manifold 47.

The principle of the operation of the second embodiment is similar to that of the first, i.e., the entire exhaust can be utilized to heat the intake manifold to vaporize the fuel-air mixture contained therein.

During engine start-up, the thermostatically controlled valves 57 are preferably closed to enable the heat buildup within the exhaust manifold 47 to proceed rapidly. After the interior of the exhaust manifold 47 reaches the desired operating temperature, the valves 57 can be opened to maintain the manifold at that temperature.

In some conditions, it may be necessary to utilize the cooling jacket 59 to assist in preventing the exhaust manifold 47 from heating the intake manifold 41 above the maximum operating temperature. This can be accomplished by running the coolant therethrough via the inlet 61 and the outlet 63.

Figure 5:
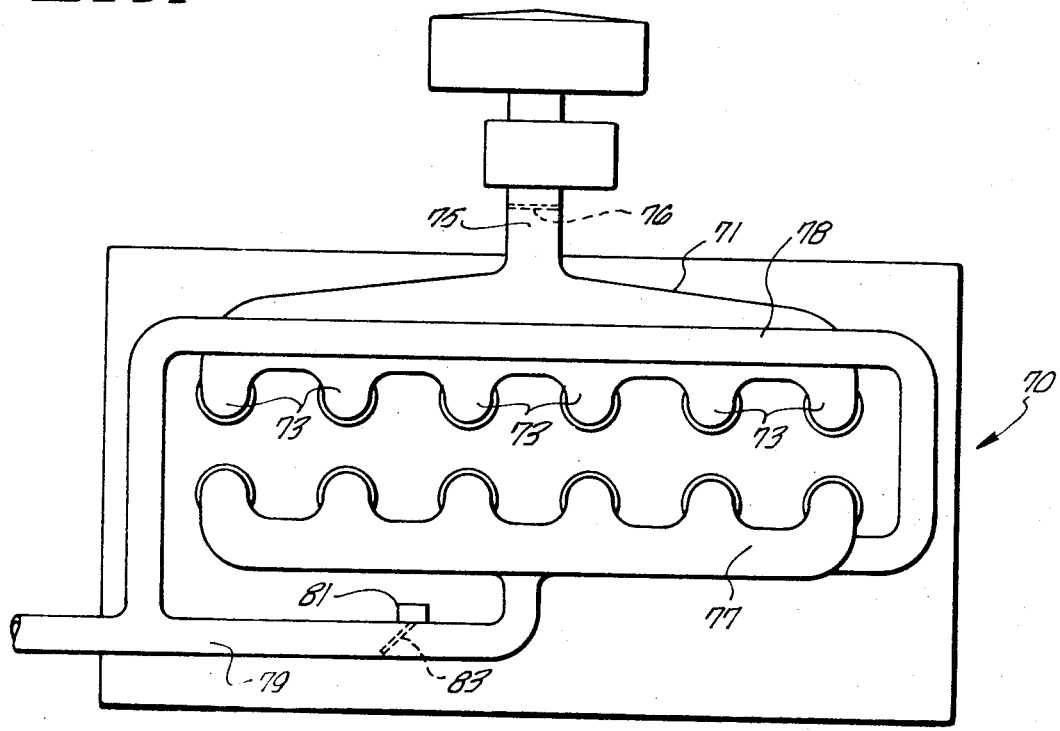
FIG. 5 is an elevational view of a third embodiment of the present invention.

FIG. 5 illustrates a third embodiment of the present invention. In this embodiment, the engine 70 is provided with an intake manifold 71 having a plurality of branches 73, an intake conduit 75 and a screen 76, all of which function in a similar manner to the intake components of the first two embodiments. In the third embodiment, an exhaust manifold 77 is provided having an exhaust pipe 78 positioned adjacent the intake manifold 71 in a side-by-side relationship. In this manner, the heat energy passing through the exhaust pipe 78 is transferred through the common wall therebetween to heat the intake manifold 71 in order to vaporize the fuel-air mixture therewithin. A bypass conduit 79 is also provided to bypass the engine exhaust from passing through the exhaust pipe 78 adjacent the intake manifold 71. As in the previous embodiments, a thermostatically controlled heat riser 81 is positioned on the bypass conduit 79 with the heat riser 81 being connected to a butterfly valve 83 mounted therein.

As can be seen, the present invention provides a novel system for vaporizing the fuel-air mixture within the intake manifold. The system utilizes part or all of the heat transfer capacity of the exhaust manifold.

It should be noted that various modifications can be made to the apparatus while still remaining within the purview of the following claims. For example, cooling fins and water cooling jackets can be utilized on any of the manifold assemblies. It should also be noted that the present invention can be utilized on any type of combustion engine such as the internal combustion engine, the Diesel engine, turbine engine, etc.

What is claimed is:

1. A combustion engine comprising:
   an engine block having a plurality of combustion chambers formed therein, said engine block further having an inlet port and an outlet port communicating with each combustion chamber;
   an intake manifold comprising a main body having an intake conduit interconnecting said main body to a carburetor and a plurality of branches interconnecting said main body to said plurality of inlet ports; and
   an exhaust manifold having a plurality of branches connected to said plurality of outlet ports, said plurality of branches further being connected to an exhaust chamber completely enveloping said intake manifold for heating the area within said manifold, said exhaust manifold further comprising a central outlet conduit communicating with said exhaust chamber, said central conduit located adjacent the intake conduit of said intake manifold, said exhaust manifold further comprising a pair of end conduits communicating with said exhaust chamber, said end conduits being located adjacent the extremities of said intake manifold, said end conduits further having thermostatically controlled valve means located therein for controlling the flow of exhaust gases therethrough.

2. The invention of claim 1 wherein said intake manifold comprises a screen mounted across the intake conduit.

3. The invention of claim 1 further including a cooling jacket completely enveloping said casing, said cooling jacket having inlet and outlet means for permitting the ingress and egress of the cooling fluid therethrough.

4. The invention of claim 3 further including cooling fin means mounted on said casing for increasing the heat transfer thereby increasing the efficiency thereof.

* * * * *